US009807133B2

(12) United States Patent
Hirabayashi

(10) Patent No.: US 9,807,133 B2
(45) Date of Patent: Oct. 31, 2017

(54) NOTIFICATION CONTROL APPARATUS FOR REPLYING TO RECEIVED INFORMATION AND NOTIFICATION CONTROL METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Kazunori Hirabayashi, Yokohama (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 600 days.

(21) Appl. No.: 14/319,473

(22) Filed: Jun. 30, 2014

(65) Prior Publication Data
US 2015/0381669 A1    Dec. 31, 2015

(51) Int. Cl.
*H04L 29/06*    (2006.01)
*H04L 29/08*    (2006.01)
*H04N 1/00*    (2006.01)
*G06F 3/12*    (2006.01)

(52) U.S. Cl.
CPC .......... *H04L 65/403* (2013.01); *H04L 67/18* (2013.01); *H04N 1/00127* (2013.01); *G06F 3/1204* (2013.01); *G06F 3/1226* (2013.01); *G06F 3/1292* (2013.01)

(58) Field of Classification Search
CPC ... H04L 65/403; H04L 67/18; H04N 1/00127; G06F 3/1226; G06F 3/1292; G06F 3/1204
See application file for complete search history.

(56) References Cited

U.S. PATENT DOCUMENTS

| 8,230,075 | B1* | 7/2012 | Weskamp | H04W 4/023 709/203 |
| 8,983,501 | B2* | 3/2015 | Dishneau | H04W 4/023 455/410 |
| 2002/0186136 | A1* | 12/2002 | Schuman | G06F 19/3418 340/573.1 |
| 2004/0106379 | A1 | 6/2004 | Zen et al. | |
| 2005/0138576 | A1* | 6/2005 | Baumert | G06F 21/35 715/862 |
| 2007/0207812 | A1* | 9/2007 | Borran | H04L 1/1829 455/452.1 |
| 2007/0287386 | A1* | 12/2007 | Agrawal | H04W 76/023 455/67.11 |

(Continued)

FOREIGN PATENT DOCUMENTS

JP    2004-021860    1/2004
JP    2008-058892    3/2008

*Primary Examiner* — Larry Donaghue
(74) *Attorney, Agent, or Firm* — Amin, Turocy & Watson LLP

(57) ABSTRACT

In accordance with one embodiment, a notification control apparatus comprises an interface and a control section. The interface receives first information sent from a terminal held by a user. The control section calculates, based on the information received by the interface, a distance from the notification control apparatus to the terminal held by the user, and carries out a control to send reply information to the terminal held by the user if the distance is within a given range, and not to send reply information if the distance is out of the given range.

7 Claims, 13 Drawing Sheets

(56) References Cited

U.S. PATENT DOCUMENTS

| | | | | |
|---|---|---|---|---|
| 2012/0003932 A1* | 1/2012 | Zhodzishsky | ..... | H04W 52/0229 |
| | | | | 455/41.2 |
| 2012/0120813 A1* | 5/2012 | Johansson | ............... | G10L 19/22 |
| | | | | 370/249 |
| 2013/0135674 A1* | 5/2013 | Hirabayashi | ........... | G06K 15/02 |
| | | | | 358/1.15 |
| 2013/0335273 A1* | 12/2013 | Pakzad | ................ | G01C 21/206 |
| | | | | 342/458 |
| 2016/0209508 A1* | 7/2016 | Hayashi | ................ | G01S 15/025 |

* cited by examiner

NOTIFICATION CONTROL APPARATUS FOR REPLYING TO RECEIVED INFORMATION AND NOTIFICATION CONTROL METHOD

FIELD

Embodiments described herein relate to a technology for giving a notification to a user when a plurality of devices providing a service is arranged.

BACKGROUND

There is a technology in which a plurality of devices connected with a network notifies a user of its own existence and a provided service. As a module for achieving such a function, conventionally, a technology such as ZeroConf, MIB (Management Information Base) and the like is used. In the network environment in which such a technology is used, a user terminal can acquire a device list, and can easily carries out connection or link with the device.

However, in a case where there is a plurality of devices on the network, as the user terminal lists up all the detected devices, there are a lot of choices when a user selects a desired device, which takes a lot of time and efforts to use the device.

DETAILED DESCRIPTION

Figure 1:
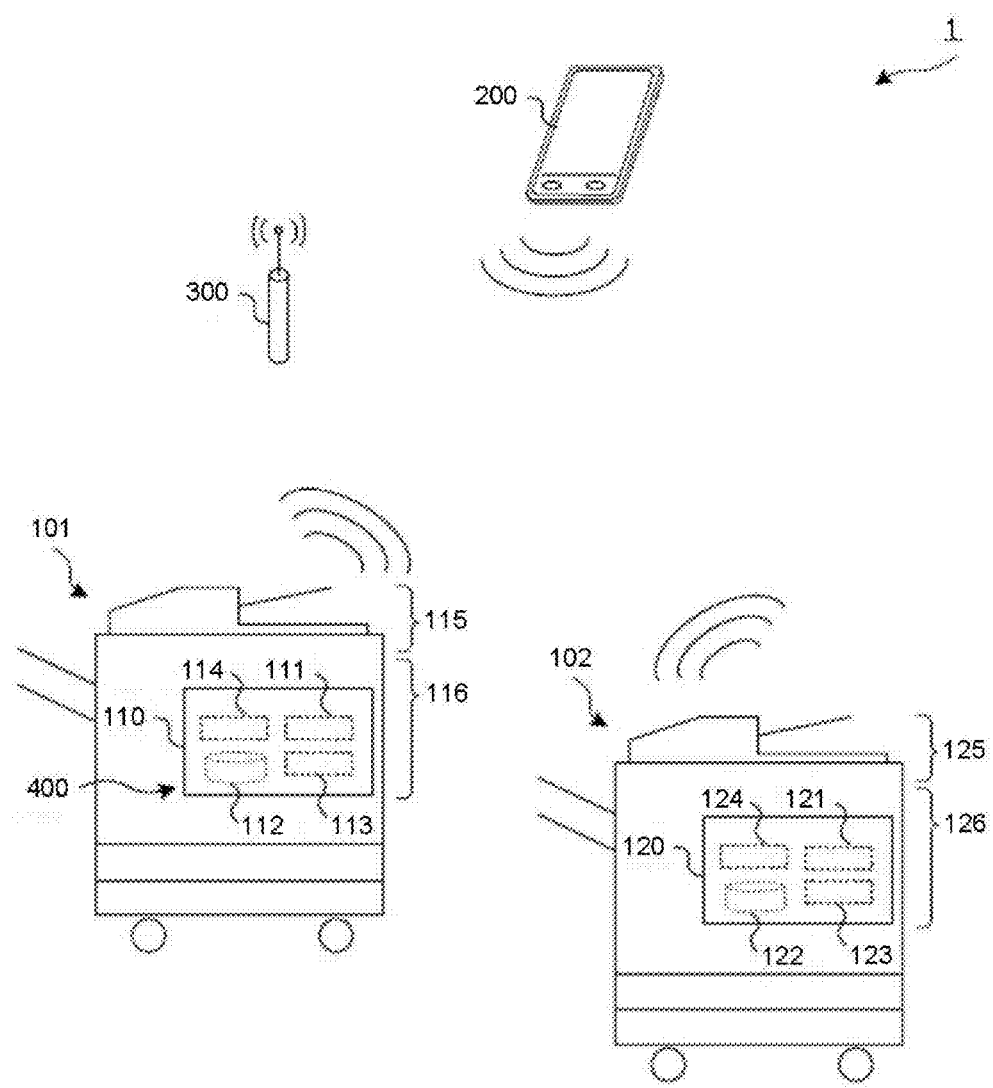
FIG. 1 is a diagram illustrating an example of the constitution of a system according to an embodiment.

In accordance with one embodiment, a notification control apparatus comprises an interface and a control section. The interface receives first information sent from a terminal held by a user. The control section calculates, based on the information received by the interface, a distance from the notification control apparatus to the terminal held by the user, and carries out a control to send reply information to the terminal held by the user if the distance is within a given range, and not to send reply information if the distance is out of the given range.

Further, in accordance with one embodiment, a notification control apparatus comprises an interface and a control section. The interface receives first information sent from a terminal held by a user. The control section sends, if the first information is received by the interface, second information to other notification control apparatuses, and sends reply information for the first information to the terminal held by the user. Further, the control section carries out, if the second information sent from other notification control apparatuses is received, a control so as not to send reply information to the terminal held by the user even if the first information is received.

The notification control apparatus described herein includes the following functions.

1. If a device held by the user sends a discovery request telegram, the notification control apparatus determines the distance with the user device. The notification control apparatus does not reply if the user device is not nearby. On the other hand, the notification control apparatus replies if the user device is nearby. In addition, the discovery request telegram refers to information which is sent to search for a nearby device.

2. If the user device is nearby, a request telegram is sent to other nearby notification control apparatuses so that other notification control apparatuses will not reply.

3. Position information of the user device and the notification control apparatus, and the strength of electric wave and the level of sound (sound wave) sent by the user device are used to determine the distance.

4. The notification control apparatus comprises a mode for carrying out a control so that other nearby notification control apparatuses will not send a reply, and if the mode is activated, a request telegram is sent to other notification control apparatuses so that other notification control apparatuses will not reply. On the other hand, the notification control apparatus further comprises a mode in which the reply function is effective in a given period.

5. If a reply stop request is received, the notification control apparatus does not reply to the discovery request telegram in a given period, or slows the reply reaction in the given period.

6. The position information of the notification control apparatus itself can be set from a nearby access point or a user device.

Each embodiment is described below. In each embodiment, the device held by the user is described as a portable terminal such as a smartphone, a tablet, a notebook computer and the like. Further, a device integrated with a notification control apparatus for providing a service is described as an image forming apparatus.

A First Embodiment

An example of the constitution of the first embodiment is shown in FIG. 1. A system 1 includes a plurality of image forming apparatuses and a portable terminal 200. Though only image forming apparatuses 101 and 102 are shown in the example in FIG. 1, there exist other image forming apparatuses.

The portable terminal 200 downloads a program stored in a storage medium into a memory through a network interface capable of carrying out wireless communication and operates the program using a CPU (Central Processing Unit), thereby achieving each function.

The image forming apparatus 101 is provided with a scanning section 115 for scanning and reading an original sheet, a printing section 116 for forming an image on a sheet, and a control section 110. The control section 110, which is a unit for uniformly controlling each component inside the image forming apparatus 101, comprises a processor 111, an auxiliary storage device 112, a network interface 113 and a memory 114. The processor 111, which is, for example, a CPU (Central Processing Unit), expands the program pre-stored in the auxiliary storage device 112 in the memory 114 and then executes the program. In this way, the processor 111 controls each component inside the image forming apparatus 101.

The auxiliary storage device 112, a nonvolatile storage device, may be for example, a HDD (Hard Disk Drive). The auxiliary storage device 112 stores, in a nonvolatile manner, image data read by the scanning section 115, image data sent from outside, the program for executing in the device and the like. The memory 114, which is a volatile primary storage device, stores executed programs and necessary data in a volatile manner. The network interface 113 performs data transmission/reception with other devices via a wireless network which is based on an access point 300. Further, the network interface 113 includes a unit for carrying out near distance wireless communication with other devices. The network interface 113 includes, for example, a wireless communication mechanism based on IEEE802.11 and a near distance wireless communication mechanism based on IEEE802.15.1. The network interface 113 may also include a unit based on other wireless communication standard.

The image forming apparatus 102, which is structurally identical to the image forming apparatus 101, is also provided with a scanning section 125, a printing section 126 and a control section 120. The control section 120 includes a processor 121, an auxiliary storage device 122, a network interface 123 and a memory 124. The image forming apparatus 101 is mainly described in the following description, and the image forming apparatus 102 and other image forming apparatuses (not shown in FIG. 1) are similar to the image forming apparatus 101. Further, the control section 110 may be constituted as the notification control apparatus 400.

The position information (held by the image forming apparatus 101) of the image forming apparatus 101 and the position information of the portable terminal 200 may be set by using, for example, the nearby access point 300 or a GPS (Global Positioning System) function of the portable terminal 200. The notification of the service (for example, printing function or copy function) provided by the image forming apparatus 101 is carried out as a reply if there is a request from outside in the image forming apparatus 101. Further, when the portable terminal 200 sends a discovery request telegram to the image forming apparatus 101, the position information of the portable terminal 200 is sent together.

Figure 2:
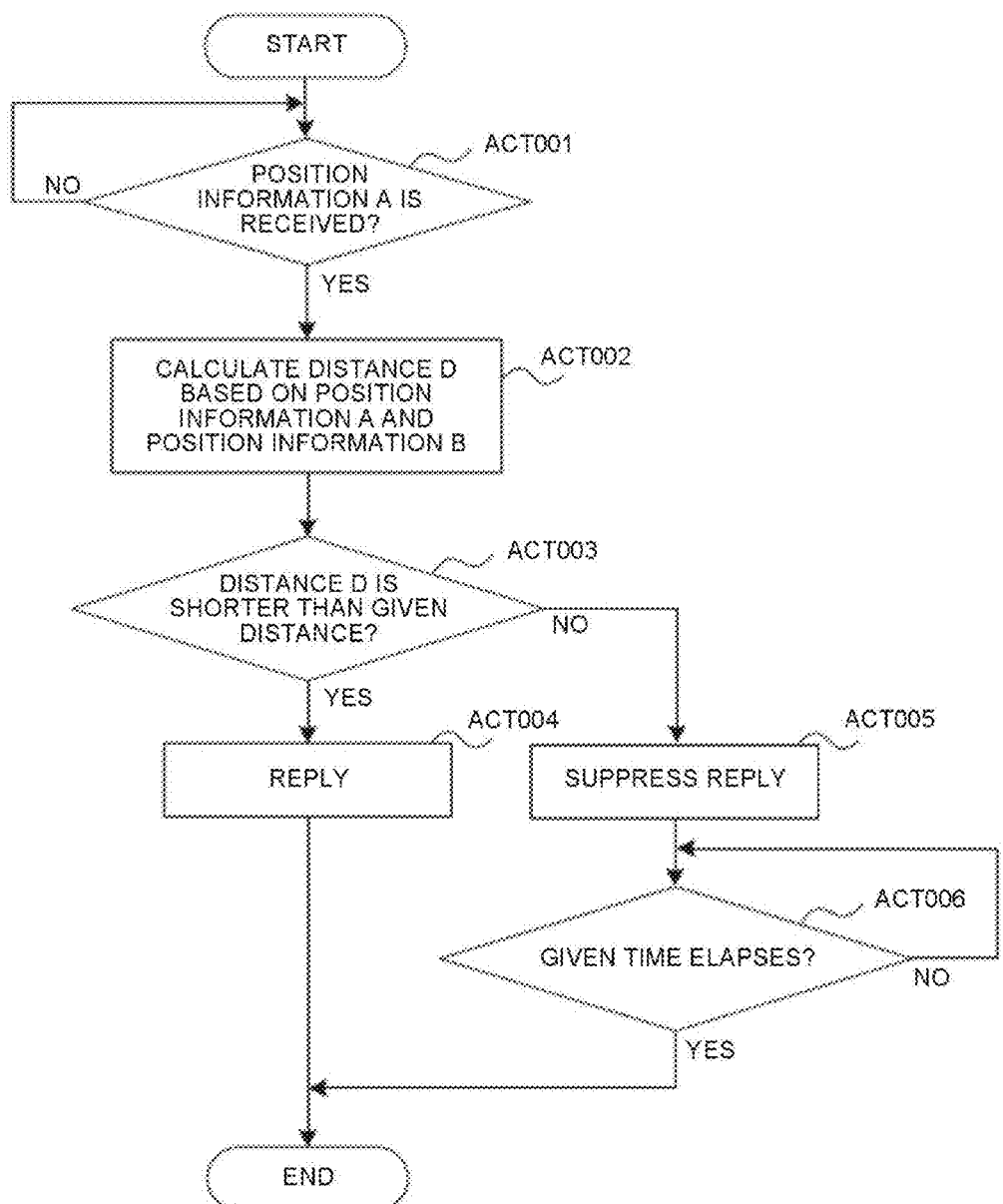
FIG. 2 is a flowchart illustrating an example of operations carried out in a first embodiment.

An example of operations of the image forming apparatus 101 in the first embodiment is shown in the flowchart in FIG. 2. In addition, though there is a case where it is necessary to carry out some kind of authentication procedure or pairing procedure when using the image forming apparatus, in the present embodiment, it is assumed that these procedures are already set and are therefore not described herein.

First, the portable terminal 200 sends, according to an operation of a user, a discovery request telegram through multicast or broadcast to search for a device on the network. The portable terminal 200 sends the position information (referred to as position information A hereinafter) thereof to the discovered image forming apparatus or other devices.

The control section 110 of the image forming apparatus 101 determines whether or not the network interface 113 received the discovery request telegram and the position information A (ACT 001), and waits until the discovery request telegram and the position information A are received (loop of NO in ACT 001). If the position information A is received (YES in ACT 001), the control section 110 calculates the distance (referred to as distance D hereinafter) between itself and the portable terminal 200 based on the position information A and its own position information B (ACT 002).

The control section 110 determines whether or not the distance D is shorter than the given distance (referred to as D_th) (ACT 003). If the distance D is shorter (closer) than the given distance D_th (YES in ACT 003), the control section 110 sends a reply telegram in reply to the discovery request telegram (ACT 004). The reply telegram sent herein includes the name of the machine and identification information, however, it is not limited to this. The reply telegram may further include service content or a message indicating the functions of the machine and the like.

On the other hand, if the distance D is longer (further) than the given distance D_th (NO in ACT 003), the control section 110 controls not to send a reply telegram. For example, in order not to send a reply telegram, a control may be carried out to skip a code instruction indicating the sending of the reply telegram. Alternatively, an operation of slowing the reply reaction may be carried out.

The control section 110 maintains the suppression state until a given time elapses (loop of NO in ACT 006). The reply suppression behavior continues for several seconds or several tens of seconds. The time can be set in each image forming apparatus in advance.

After ACT 004, or if it is YES in ACT 006, the processing in the flowchart shown in FIG. 2 is ended, alternatively, the flow may also return to ACT 001.

Figure 3:
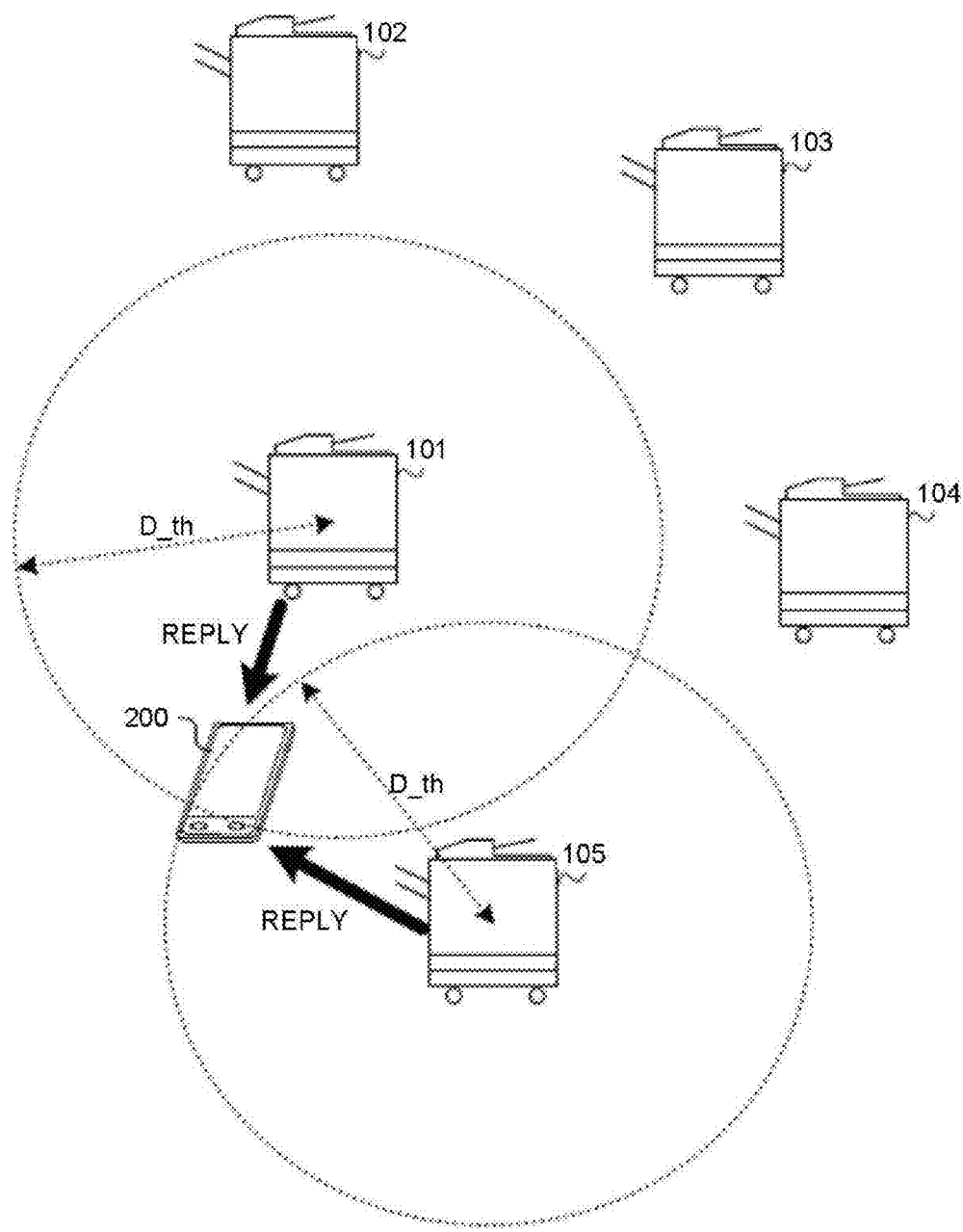
FIG. 3 is a diagram illustrating an example of the position relation between a portable terminal and each image forming apparatus according to the first embodiment.

In accordance with the embodiment described above, as shown in FIG. 3, if the portable terminal 200 enters the range of the radius distance D_th of the image forming apparatus, the image forming apparatus sends a reply telegram. In the example shown in FIG. 3, as the portable terminal 200 is positioned within the radius distances D_th of the image forming apparatus 101 and the image forming apparatus 105, the image forming apparatus 101 and the image forming apparatus 105 send reply telegram. On the other hand, as the portable terminal 200 is not positioned within the radius distances D_th of the image forming apparatuses 102~104, the image forming apparatuses 102~104 do not send a reply telegram even if the discovery request telegram is detected.

Figure 4:
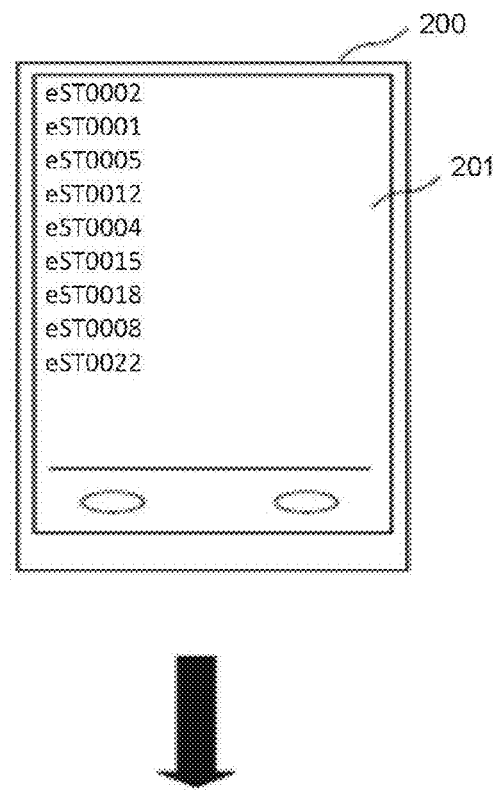
FIG. 4 is a diagram illustrating an example of the display on a conventional portable terminal and an example of the display on the portable terminal according to the first embodiment.
Figure 4:
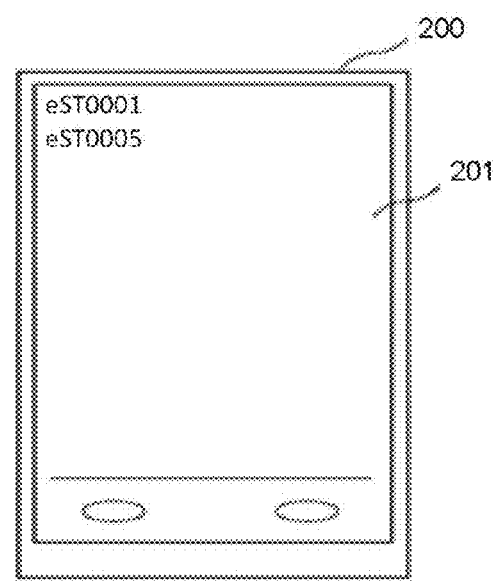

An example of the display on the portable terminal 200 is illustrated with reference to FIG. 4. Conventionally, all the apparatuses which received the discovery request telegram are displayed in a list on the touch panel display 201 of the portable terminal 200, as shown in the upper portion of FIG. 4. On the other hand, in accordance with the embodiment described above, the list is narrowed to the list shown in the lower portion of FIG. 4.

Figure 5:
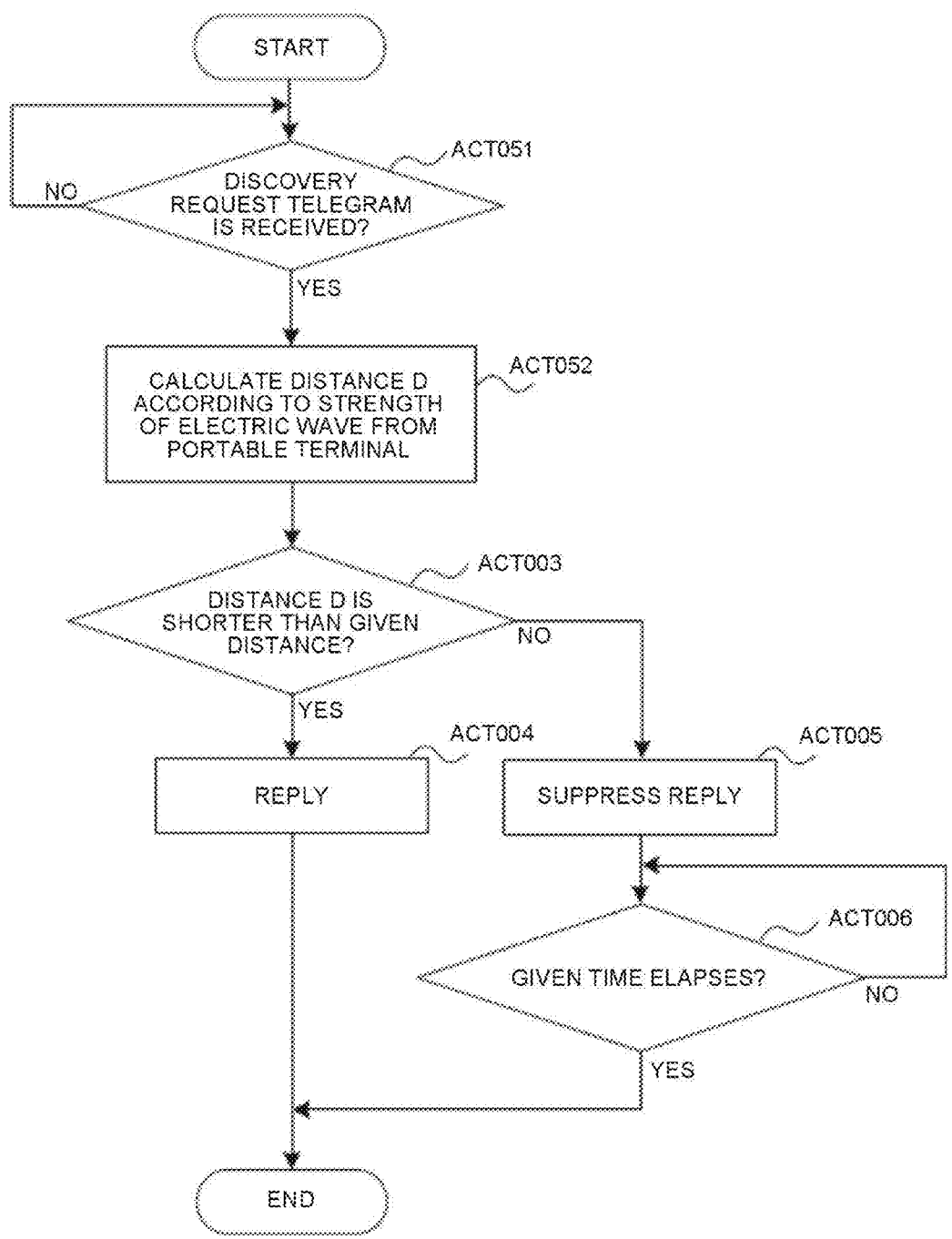
FIG. 5 is a diagram illustrating an example of operations carried out when calculating a distance based on the strength of electric wave.

In the example above, the distance D is calculated based on the position information, however, the distance D may also be calculated based on the strength of the electric wave of the discovery request telegram sent by the portable terminal 200. An example of operations carried out in this case is shown in FIG. 5. In this case, a near distance wireless communication based on IEEE802.15.1 may be used.

The control section 110 of the image forming apparatus 101 determines whether or not the network interface 113 received the discovery request telegram (ACT 051). If the discovery request telegram is received (YES in ACT 051), the strength of the electric wave of the discovery request telegram is acquired to calculate the distance D (ACT 052). The conversion from the strength of the electric wave to the distance D can be carried out by using a formula set in advance; alternatively, a table in which the strength of the electric wave is associated with the distance is stored in the auxiliary storage device 112 in advance, and the conversion can be carried out by reference to the table. In a case of using a formula, a formula in which the power of the sending-side and the reception-side, the antenna performance and the like are set as specified value can be used.

The following processing, which is the same with that shown in FIG. 2, is therefore not described repeatedly.

In accordance with the first embodiment, only the image forming apparatuses nearby the portable terminal 200 are displayed on the portable terminal 200, which makes it easier for a user to select the nearby image forming apparatus.

A Second Embodiment

Figure 6:
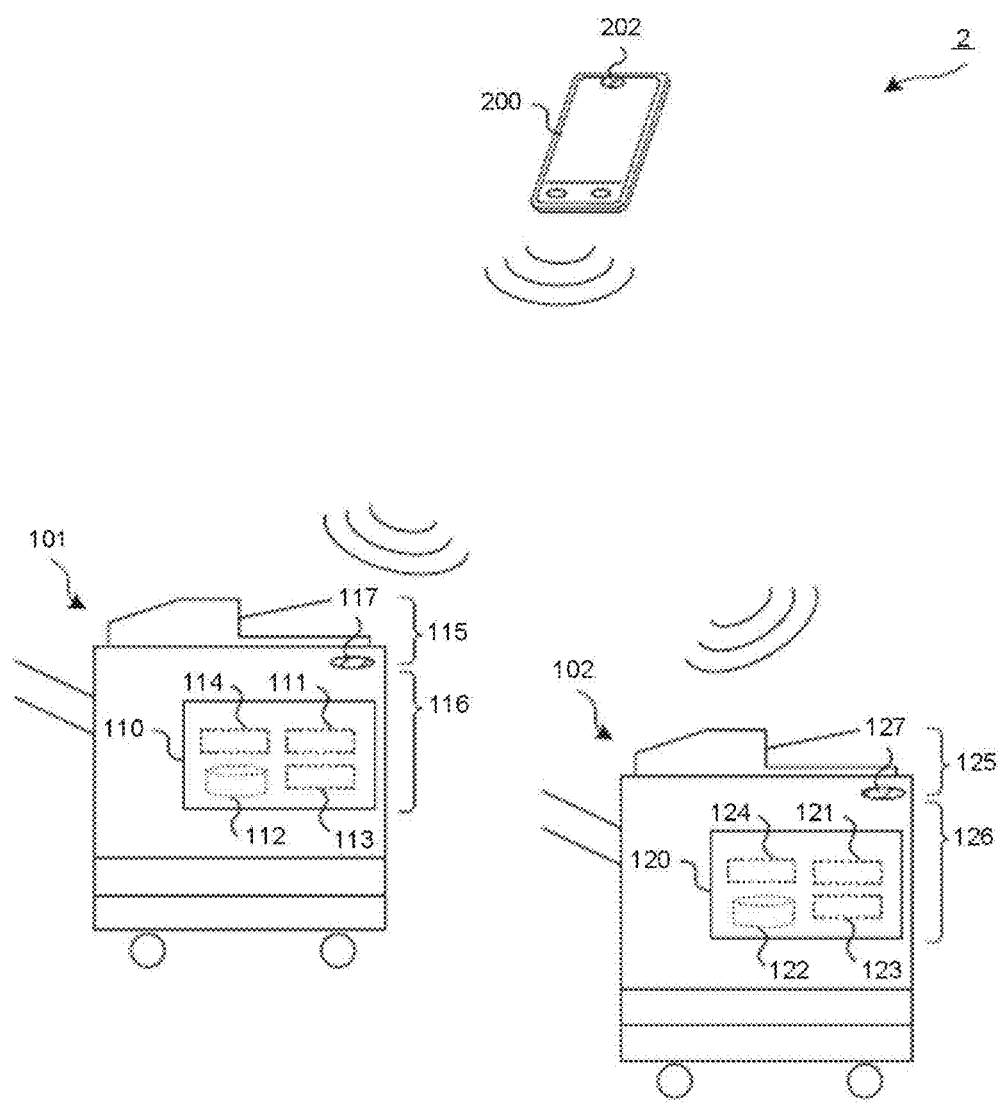
FIG. 6 is a diagram illustrating an example of the constitution of a system according to a second embodiment.

In the second embodiment, specified sound pattern, sound wave or ultrasonic sent by the portable terminal held by the user is collected, and the distance D is calculated according to the sound level. An example of the constitution of the second embodiment is shown in FIG. 6. A system 2 is constituted by further including a speaker 202 in the portable terminal 200 described in the first embodiment, and including sound collecting sections 117 and 127 in the image forming apparatuses 101 and 102. The speaker 202 of the portable terminal 200 outputs a pre-defined sound (specified frequency sound) at a pre-defined level. For the present embodiment, sound data may be newly set, alternatively, the sound data prepared in the portable terminal 200 in advance, for example, a call ring sound or an incoming mail sound and the like, may be used. Further, a low sound or a high sound (ultrasonic) which cannot be heard by human ears may also be applied.

The sound collecting section 117 of the image forming apparatus 101 collects the sound from outside using a mike, converts the collected sound signal into digital data using an A/D conversion section, and then outputs the resulting data to the control section 110. With this constitution, the control section 110 can measure the level of the sound sent by the speaker 202 of the portable terminal 200.

Figure 7:
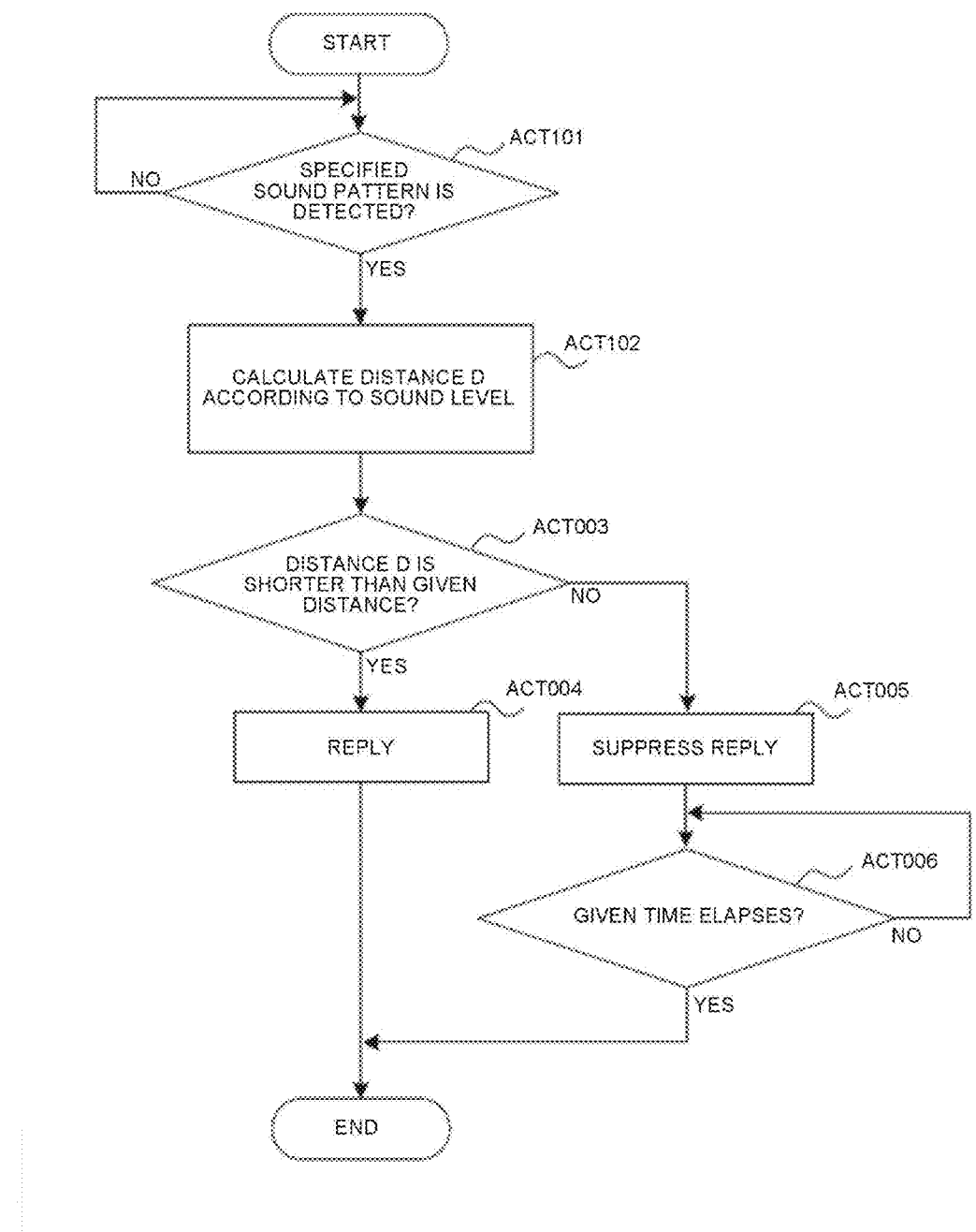
FIG. 7 is a flowchart illustrating an example of operations carried out in the second embodiment.

An example of operations of the image forming apparatus 101 in the second embodiment is shown in FIG. 7. The control section 110 determines whether or not a specified sound pattern is detected (ACT 101). At this time, the control section 110 removes, using a conventional technology, the noise different from the specified pattern from the sound collected by the sound collecting section 117 and extracts the data of the specified pattern merely. The control section 110 waits until the specified sound pattern is detected (Loop of NO in ACT 101).

If the specified sound pattern is detected (YES in ACT 101), the control section 110 calculates the distance D according to the level of the sound pattern (ACT 102). Herein, a specified mathematical formula for calculating the distance according to the sound level may be used, alternatively, a table in which the sound level is associated with the distance is prepared, and the distance may be calculated by reference to the table.

The following operations, which are the same with those shown in the first embodiment, are therefore not described repeatedly.

A Third Embodiment

In the third embodiment, the portable terminal, if positioned within the range of the given distance D_th, sends a reply, meanwhile, sends a reply suppression request to other image forming apparatuses. Other image forming apparatuses receiving the reply suppression request suppress a reply even if the discovery request telegram is received.

Figure 8:
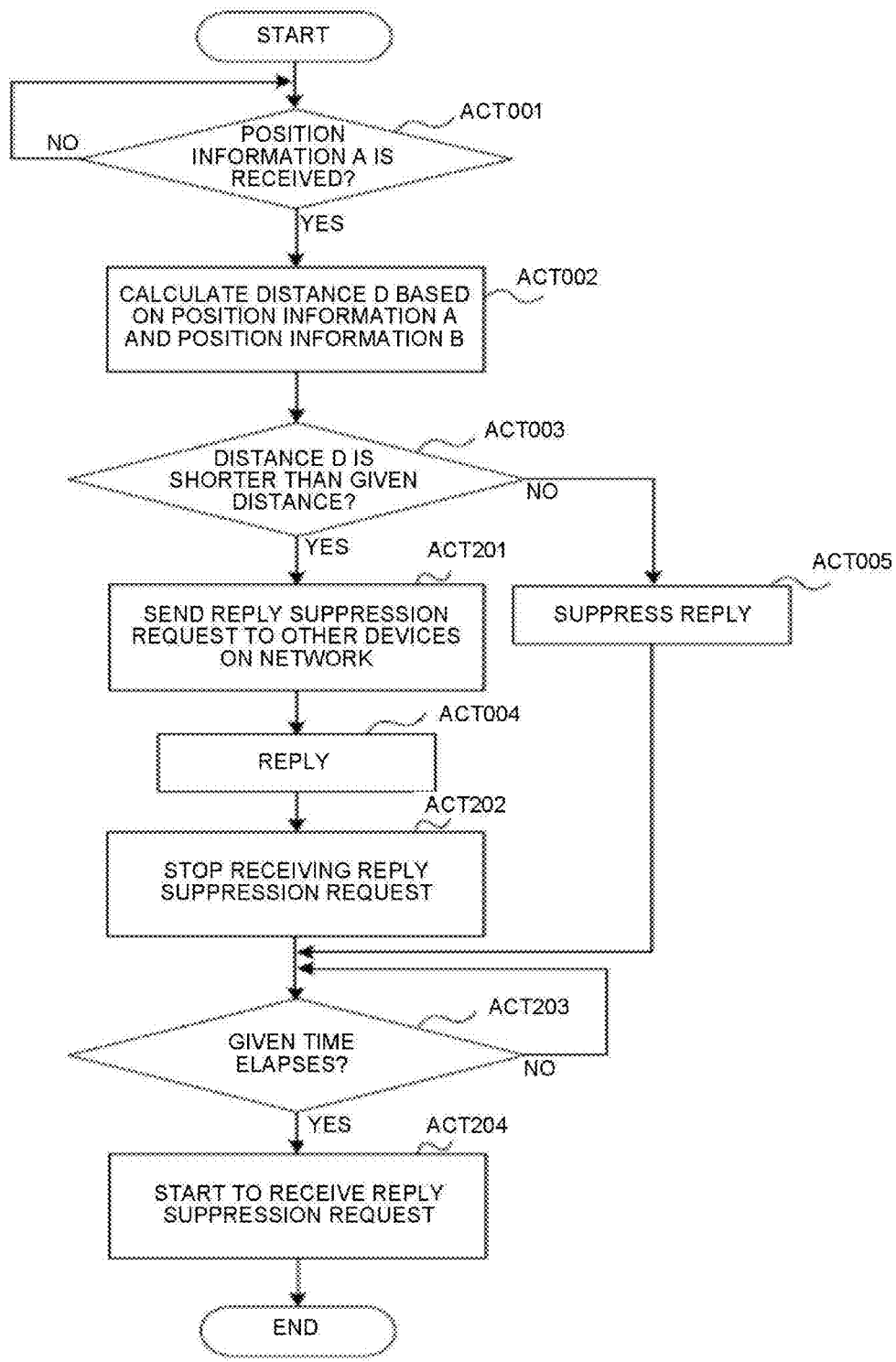
FIG. 8 is a flowchart illustrating an example of operations of an image forming apparatus which is at a position close to a portable terminal according to a third embodiment.

FIG. 8 is a flowchart illustrating an example of operations carried out in the third embodiment. In addition, the constitution of the apparatus is the same as that of the first embodiment and is therefore not described repeatedly.

The control section 110 of the image forming apparatus 101, as stated in the first embodiment, determines whether or not the position information A is received (ACT 001), and calculates the distance D (ACT 002), and then determines whether or not the distance D is shorter than the given distance D_th (ACT 003). If the distance D is longer (further) than the given distance D_th (NO in ACT 003), the control section 110 suppresses a reply to the discovery request telegram (ACT 005), and then the flow proceeds to ACT 203.

On the other hand, if the distance D is shorter (closer) than the given distance D_th (YES in ACT 003), the control section 110 sends a telegram of the reply suppression request to other image forming apparatuses on the network (ACT 201). The control section 110, if recognizing the specified information (IP address and the like) of other image forming apparatuses, may sends the telegram of the reply suppression request individually, or sends multi-telegrams through multicast or broadcast synchronously. Other image forming apparatuses receiving the reply suppression request carry out the operations in FIG. 9 which will be described later.

The control section 110 sending the reply suppression request to other image forming apparatuses replies to the discovery request telegram from the portable terminal 200 (ACT 004), and stops receiving the reply suppression request from other image forming apparatuses (ACT 202). Through the operation in ACT 202, the control section 110 ignores, even if the reply suppression request is received from other image forming apparatuses, the received reply suppression request.

After the processing in ACT 202 or ACT 005, the control section 110 maintains the current state until a given time (several seconds or several tens of seconds) elapses (Loop of NO in ACT 203), if the given time elapses (YES in ACT 203), the apparatus, if in a state of stopping receiving the reply suppression request, releases the state to start to receive the reply suppression request (ACT 204).

Figure 9:
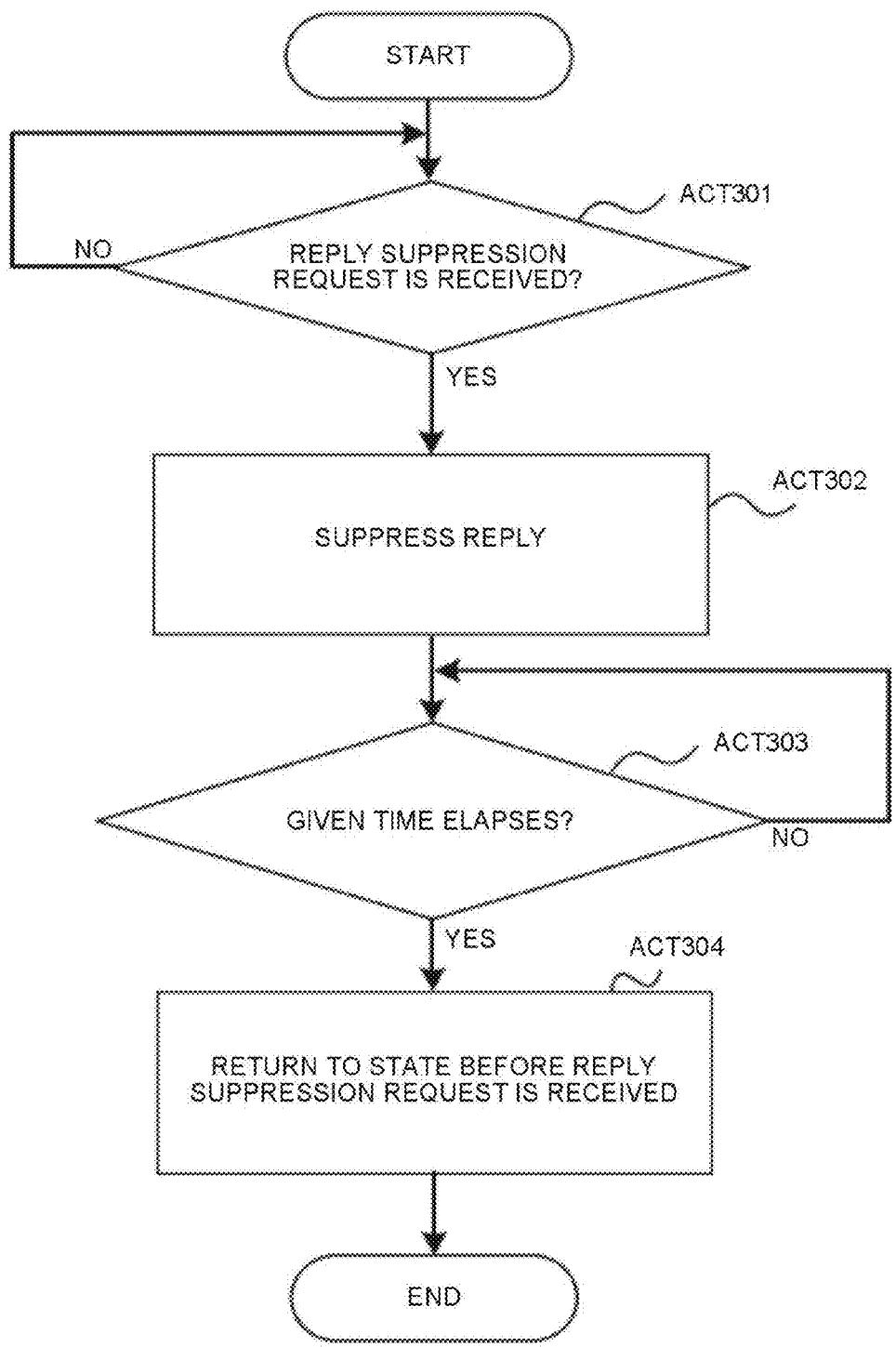
FIG. 9 is a flowchart illustrating an example of operations of the image forming apparatus which received a reply suppression request according to the third embodiment.

FIG. 9 is a flowchart illustrating an example of operations relating to the reception of the reply suppression request. Herein, it is exemplified that the image forming apparatus 101 receives the reply suppression request telegram. The control section 110, if receiving the reply suppression request telegram (YES in ACT 301), carries out a suppression operation so as not to reply to the discovery request telegram from the portable terminal 200 (ACT 302), and maintains the state until the given time (several seconds or several tens of seconds) elapses (Loop of NO in ACT 303). After the given time elapses (YES in ACT 303), the control section 110 returns to a state before the reply suppression request is received (ACT 304).

Figure 10:
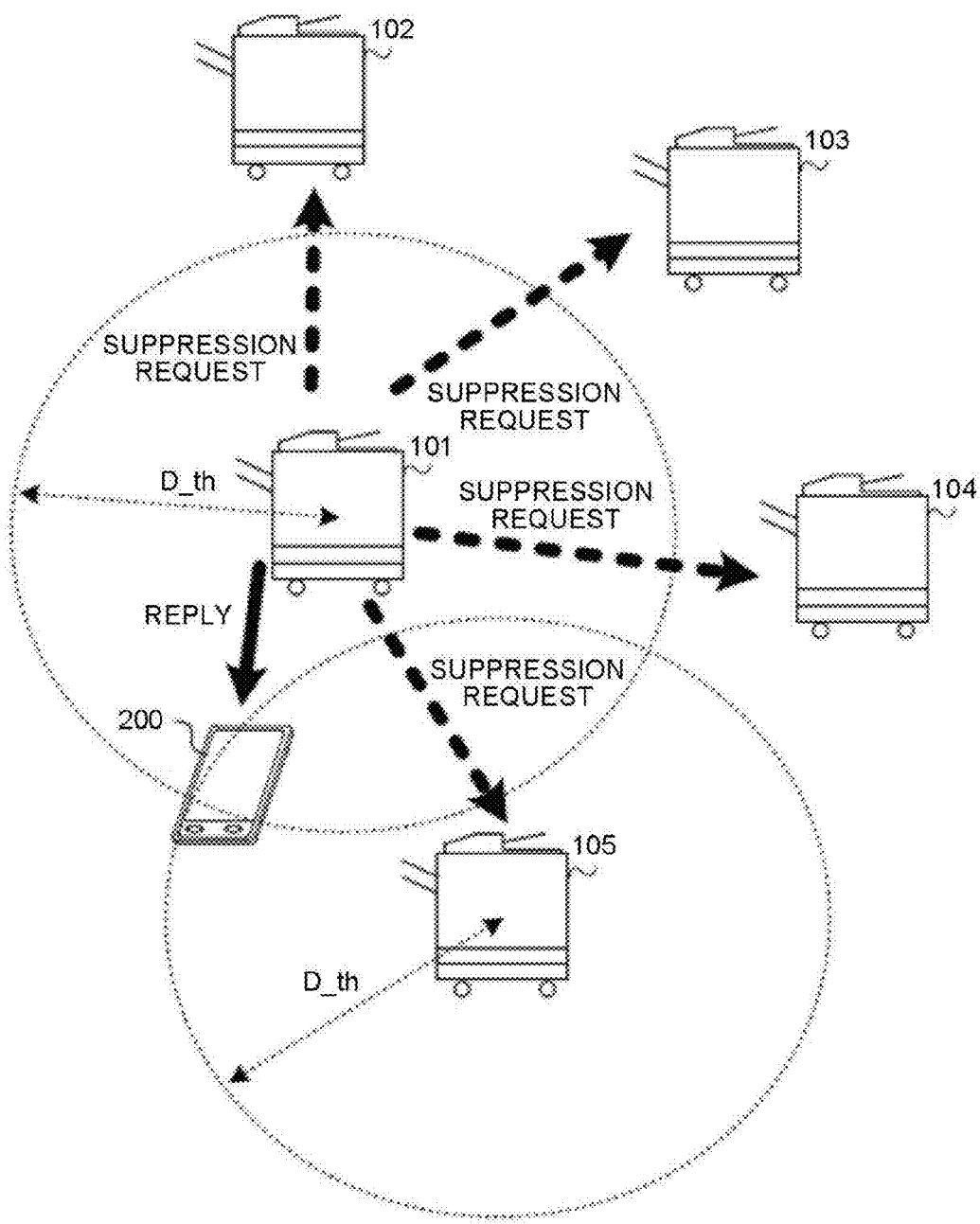
FIG. 10 is a diagram illustrating an example of the position relation between a portable terminal and each image forming apparatus according to the third embodiment.
Figure 11:
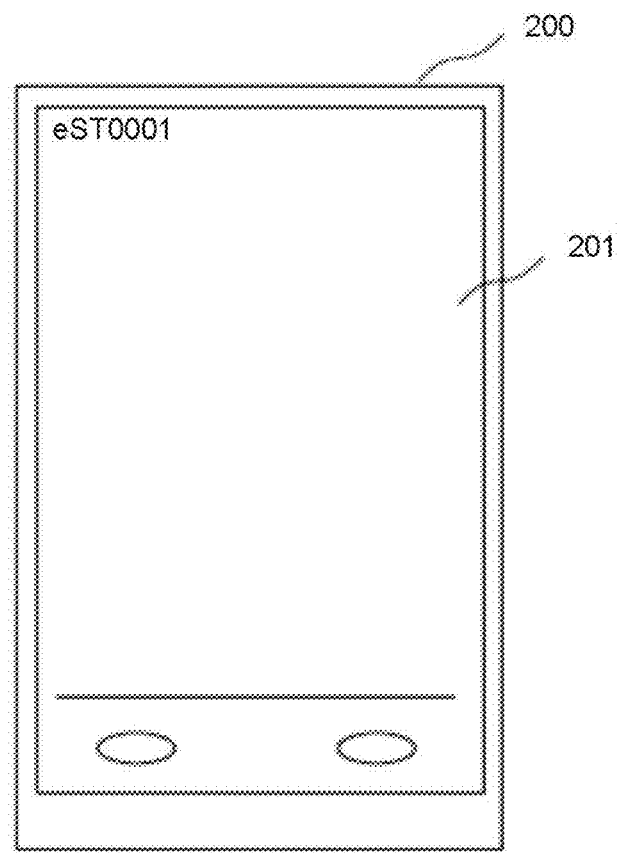
FIG. 11 is a diagram illustrating an example of the display on the portable terminal according to the third embodiment.

In accordance with the third embodiment, as shown in FIG. 10, it can be set that within the image forming apparatuses 101~105 on the network, only the apparatus, which is the first to determine that the portable terminal 200 is nearby, sends a reply. On the other hand, other image forming apparatuses do not reply even if the portable terminal 200 is positioned within the range of the given distance D_th. Further, in a case where only the image forming apparatus carrying out the operations of the third embodiment is on the network, as shown in FIG. 11, only one nearby image forming apparatus is displayed on the portable terminal 200. In this way, the time and effort when selecting an apparatus by the user can be reduced, and the mistakes on device selection and the like can be reduced as well.

Further, the third embodiment may be applied to the distance calculation using the strength of the electric wave in the first embodiment or the distance calculation according to the sound level described in the second embodiment.

A Fourth Embodiment

The image forming apparatus according to the fourth embodiment comprises a mode for carrying out a control so that other image forming apparatuses will not send a reply. For example, the user presses a specified button on a control panel of the image forming apparatus 101 to switch the image forming apparatus 101 to a suppression mode, and to send a telegram of the reply suppression request to other image forming apparatuses (for example, the image forming apparatus 102). In this way, the image forming apparatus 101 receives a discovery request telegram and replies if the portable terminal 200 is within the range of the given distance D_th. On the other hand, the image forming apparatus 102, even if receiving the discovery request telegram, does not reply to the telegram within a given period, or slows the reply reaction. The switching to the suppression mode may be carried out through a button operation as stated above, or through a technology of a near distance wireless communication from the portable terminal 200. Further, items which can be selected from the control panel may be arranged. In a case of proximity wireless communication, if it is determined that the portable terminal 200 is held over the image forming apparatus, a mode transition operation is carried out.

Figure 12:
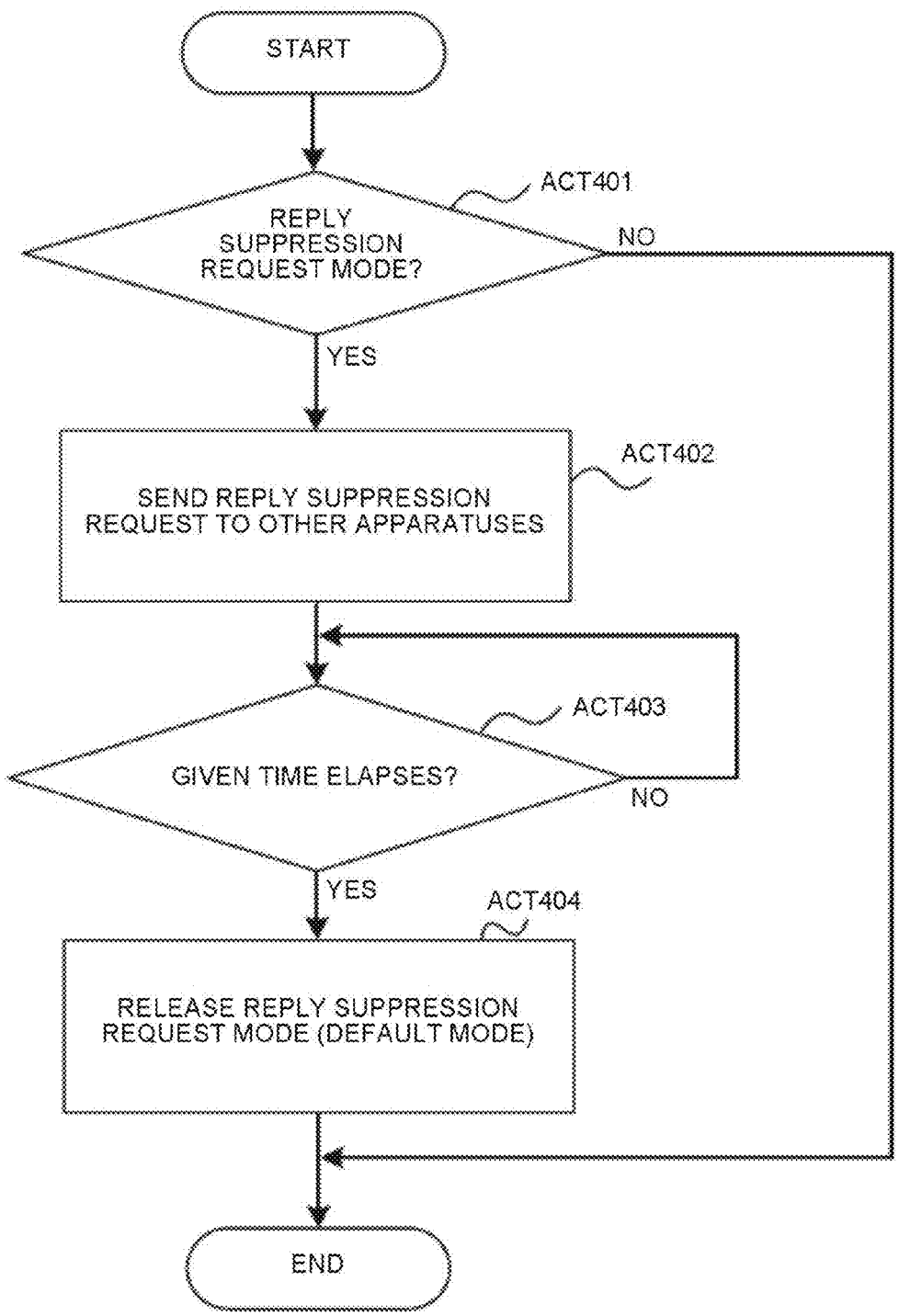
FIG. 12 is a flowchart illustrating an example of operations carried out in a fourth embodiment.

An example of operations of the image forming apparatus 101 receiving a mode switching according to the fourth embodiment is shown in FIG. 12. The control section 110, if receiving an instruction of switching to the suppression mode from the user (YES in ACT 401), sends the reply suppression request telegram to other image forming apparatuses (ACT 402). Other image forming apparatuses (for example, the image forming apparatus 102) carries out the operations shown in FIG. 9 so as not to send a reply, or so as to slow the reaction even if the discovery request telegram is received. On the other hand, the image forming apparatus 101 executes, for example, the operations shown in FIG. 2 to receive a discovery request telegram and reply if the portable terminal 200 is within the range of the given distance D_th.

The control section 110 maintains the reply suppression request mode until the given time elapses (Loop of NO in ACT 403). That is, during the period of the given time, other image forming apparatuses are not listed up, and only the image forming apparatus 101 is displayed on the portable terminal 200.

After the given time elapses (YES in ACT 403), the reply suppression request mode is released (ACT 404). Through the processing in ACT 404, other image forming apparatus also receive the discovery request telegram and reply if the portable terminal 200 is within the range of the given distance D_th.

The effect based on the fourth embodiment is the same with the effect based on the third embodiment, and the user is merely notified of the apparatus sending the reply suppression request to other image forming apparatuses. Further, only the image forming apparatus explicitly designated by the user is displayed. In this way, the time and effort when the user selects a desired device can be reduced, and the mistakes on device selection and the like can be reduced as well.

The fourth embodiment may be applied to the distance calculation using the strength of the electric wave in the first embodiment or the second and the third embodiments.

A Fifth Embodiment

In contrast to the fourth embodiment, the fifth embodiment comprises a function which does not send a reply notification in a default mode even if a discovery request telegram from the portable terminal 200 is received, and replies in a given period if the user designates a reply notification mode. The transition to the mode, which is the same as that in the fourth embodiment, may be carried out through an operation on a specified button by the user, or by arranging items which can be selected from the control panel, or through technologies such as proximity wireless communication and the like. The image forming apparatus according to the fifth embodiment, if receiving these operations, switches to the mode to reply in the given period.

Figure 13:
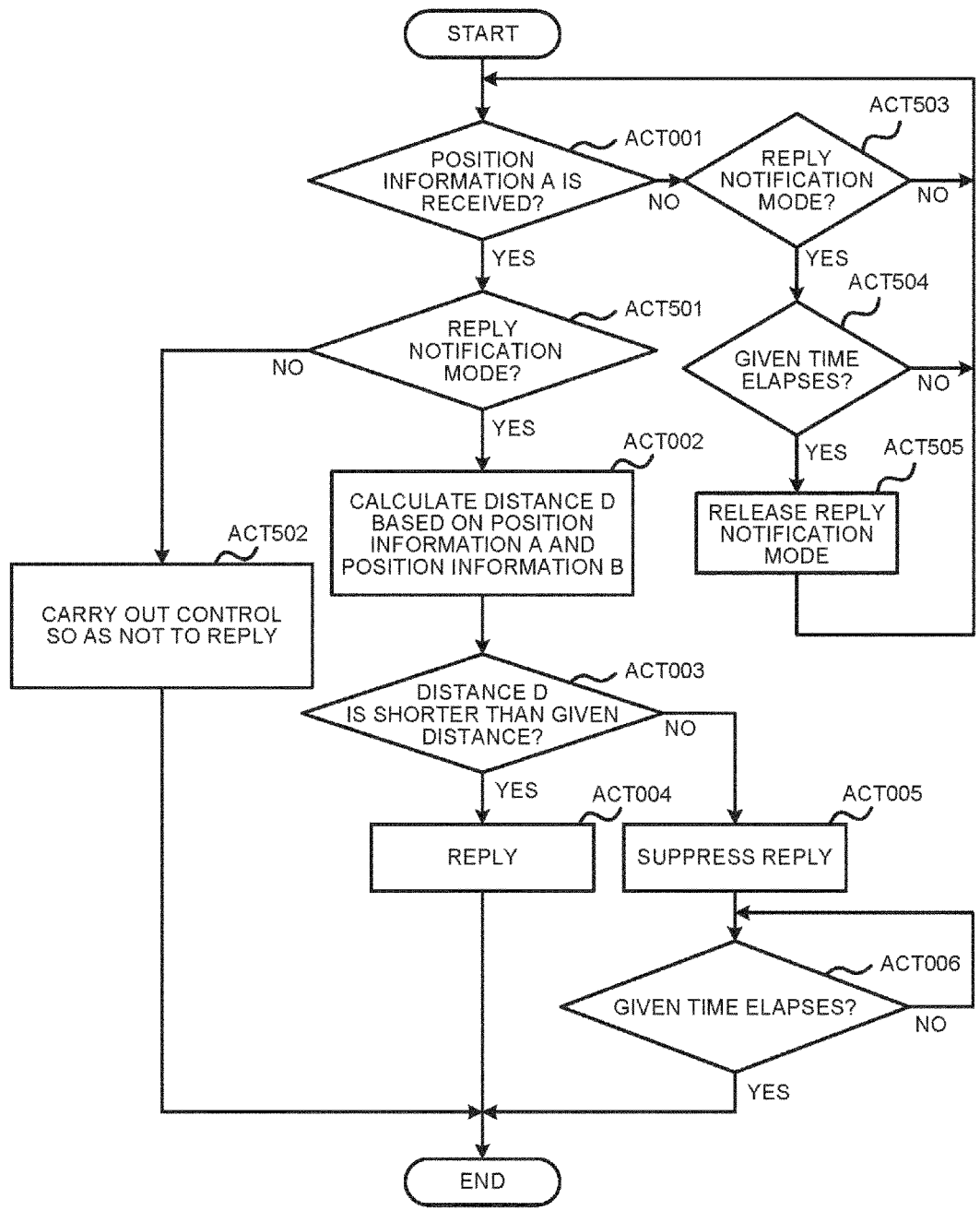
FIG. 13 is a flowchart illustrating an example of operations carried out in a fifth embodiment.

FIG. 13 is a flowchart illustrating an example of operations carried out in the fifth embodiment. The control section 110 determines whether or not the position information A of the portable terminal 200 is received, as stated in the first embodiment (ACT 001). If the position information A is received (YES in ACT 001), the control section 110 determines whether or not the current mode is the reply notification mode (ACT 501).

If the current mode is not the reply notification mode (NO in ACT 501), the control section 502 carries out a control so as not to send a reply notification (ACT 502). On the other hand, if the current mode is the reply notification mode (YES in ACT 501), the control section 110 carries out the operations in ACT 002-ACT 006 described in the first embodiment.

In ACT 001, if the position information A is not received (NO in ACT 001), the control section 110 determines whether or not it is the reply notification mode (ACT 503), and if it is the reply notification mode (YES in ACT 503), the control section 110 determines whether or not a given time elapses (ACT 504). If the given time elapses (YES in ACT 504), the control section 110 releases the reply notification mode (ACT 505). If it is negative in ACT 503 or ACT 504, or if the processing in ACT 505 is completed, the flow returns to ACT 001 in the present embodiment. In addition, it is also applicable that the processing in ACT 503, ACT 504 and ACT 505 is carried out asynchronously without being incorporated in the present flowchart.

In the present embodiment, the image forming apparatus does not give a notification in a default mode, and sends a reply to the portable terminal 200 only during the period of transiting to the reply notification mode. In accordance with the present embodiment, only the explicitly designated image forming apparatus is listed up, which improves the convenience.

The fifth embodiment may be applied to the distance calculation using the strength of the electric wave in the first embodiment or the second and the third embodiments.

The control section 110 can be provided as a notification control apparatus 400. In the embodiments described above, the image forming apparatus is described as an example of an apparatus providing a service. However, the present invention is not limited to this, and the notification control apparatus described in the embodiments stated above may also be integrated with other apparatus.

Further, in the embodiments described above, the function for applying each embodiment is pre-recorded in the apparatus. However, the present invention is not limited to this. Same function may be downloaded to the apparatus from a network. Alternatively, same function recorded in a recording medium may also be installed in the apparatus. The form of the recording medium is not limited as long as the recording medium can store programs like a CD-ROM and the like and is readable by an apparatus. Further, the function realized by an installed or downloaded program can also be realized through the cooperation with an OS (Operating System) installed in the apparatus and the like.

In accordance with the embodiments, a device close to the position of the user can be selected easily, which improves the convenience.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claim is:

1. A image forming apparatus, comprising:
a processor that executes instructions to perform operations, comprising:
receiving, via an interface, first information sent from a terminal held by a user;
calculating, based on the first information received by the interface, a distance from the image forming apparatus to the terminal held by the user, and carrying out a control to send reply information to the terminal held by the user if the distance is within a given range, and not to send reply information if the distance is out of the given range;
sending second information to other image forming apparatuses if the distance is within a given range; and
carrying out, if the second information is received from the other image forming apparatuses, a control so as not to send reply information to the terminal held by the user even if the first information is received.

2. The image forming apparatus according to claim 1, wherein
the interface receives the position information of the terminal, and
wherein the operations further comprise calculating the distance based on the position information received by the interface and the position information of the image forming apparatus.

3. The image forming apparatus according to claim 1, wherein
the interface receives the first information through a wireless communication, and
wherein the operations further comprise calculating the distance based on the strength of electric wave when the first information is received.

4. The image forming apparatus according to claim 1, wherein
the first information is a sound sent from the terminal held by the user,
the interface collects the sound sent from the terminal, and
wherein the operations further comprise calculating the distance based on the level of the collected sound.

5. The image forming apparatus according to claim 1, wherein
the operations further comprise sending the second information to other image forming apparatuses if a mode switching instruction is received from the user.

6. The image forming apparatus according to claim 1, wherein
the operations further comprise sending reply information to the terminal held by the user if a mode switching instruction is received from the user and the mode is switched.

7. A image forming method of the image forming apparatus, including:
receiving, by a system comprising a processor, first information sent from a terminal held by a user;
calculating, by the system, based on the received information, a distance from the image forming apparatus to the terminal held by the user;
sending, by the system, reply information to the terminal held by the user if the distance is within a given range;
not sending, by the system, reply information if the distance is out of the given range;
sending, by the system, second information to other image forming apparatuses if the distance is within a given range; and
carrying out, by the system, if the second information is received from the other image forming apparatuses, a control so as not to send reply information to the terminal held by the user even if the first information is received.

* * * * *